(12) United States Patent
Pehler

(10) Patent No.: US 8,459,718 B2
(45) Date of Patent: Jun. 11, 2013

(54) CARPET SYSTEM

(75) Inventor: Jeffrey John Pehler, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 16 days.

(21) Appl. No.: 13/170,703

(22) Filed: Jun. 28, 2011

(65) Prior Publication Data

US 2013/0001978 A1    Jan. 3, 2013

(51) Int. Cl.
*B62D 25/20* (2006.01)

(52) U.S. Cl.
USPC ........................................ 296/97.23

(58) Field of Classification Search
USPC .............. 296/37.8, 39.1, 97.23, 24.33, 37.16, 296/37.14, 37.1
See application file for complete search history.

(56) References Cited

U.S. PATENT DOCUMENTS

| | | | | |
|---|---|---|---|---|
| 2,709,105 | A * | 5/1955 | Kramer | 296/97.23 |
| 3,703,424 | A * | 11/1972 | Charnock et al. | 156/224 |
| 4,016,318 | A | 4/1977 | DiGioia et al. | |
| 4,898,419 | A * | 2/1990 | Kenmochi et al. | 296/204 |
| 5,130,187 | A * | 7/1992 | Eberhardt | 428/95 |
| 5,573,294 | A * | 11/1996 | Mack | 296/97.23 |
| 5,766,722 | A * | 6/1998 | Morimoto | 428/88 |
| 6,383,599 | B1 * | 5/2002 | Bell et al. | 428/95 |
| 6,986,547 | B2 * | 1/2006 | Parrish | 296/193.07 |
| 7,530,620 | B2 | 5/2009 | Wozniak | |
| 2003/0102690 | A1 * | 6/2003 | Gebreselassie et al. | 296/97.23 |
| 2007/0194592 | A1 | 8/2007 | Lindsay et al. | |

* cited by examiner

*Primary Examiner* — Glenn Dayoan
*Assistant Examiner* — Sunsurraye Westbrook
(74) *Attorney, Agent, or Firm* — Gifford, Krass, Sprinkle, Anderson & Citkowski, P.C.

(57) ABSTRACT

A carpet assembly having a piece of carpet with a backside, the backside having a plurality of contours and a generally rigid backside reinforcement panel attached to the backside of the piece of carpet. The backside reinforcement panel can have a shape conforming to and covering at least a portion of at least one of the plurality of contours and provides for the piece carpet to maintain its contoured shape for extended periods of time.

12 Claims, 2 Drawing Sheets

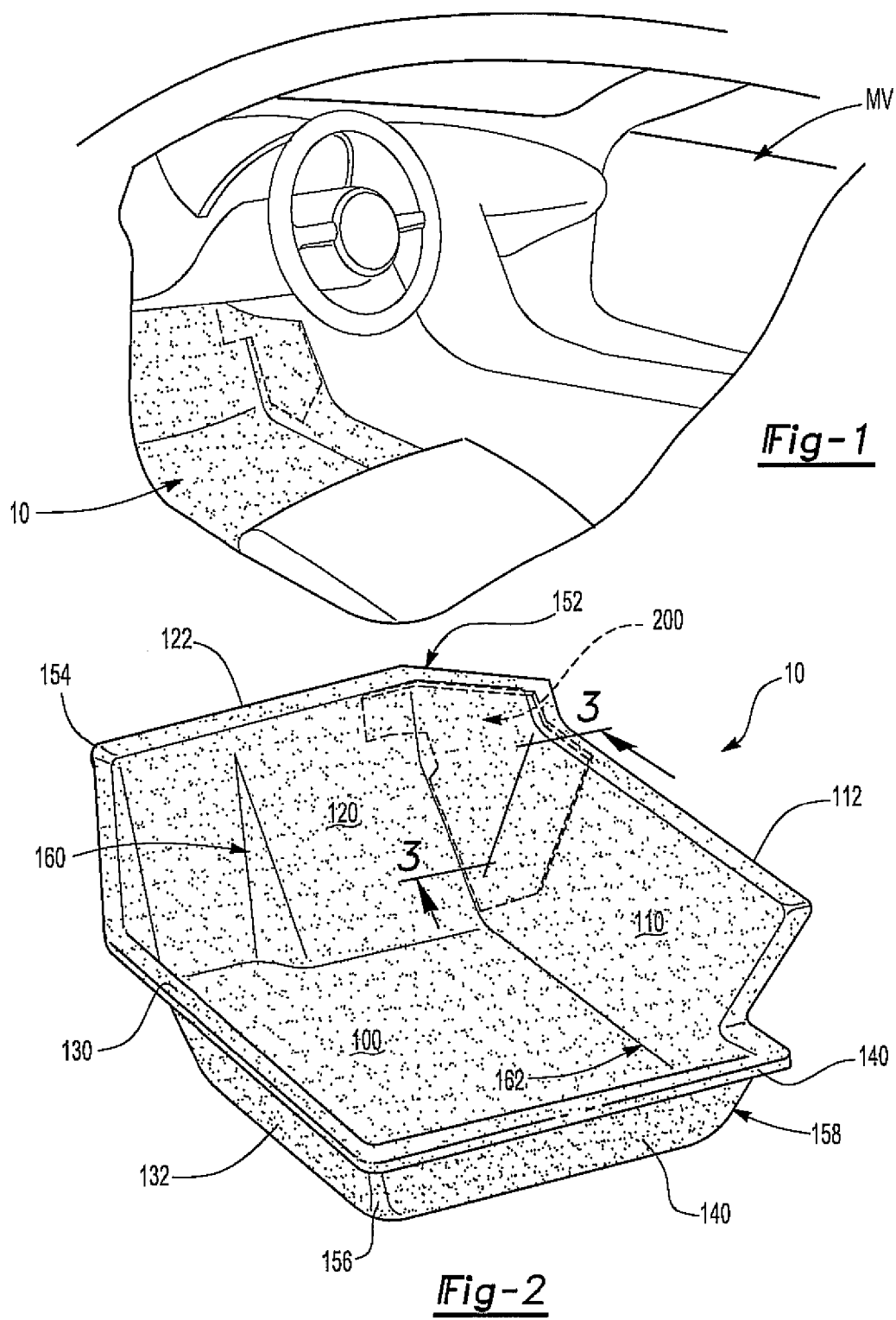

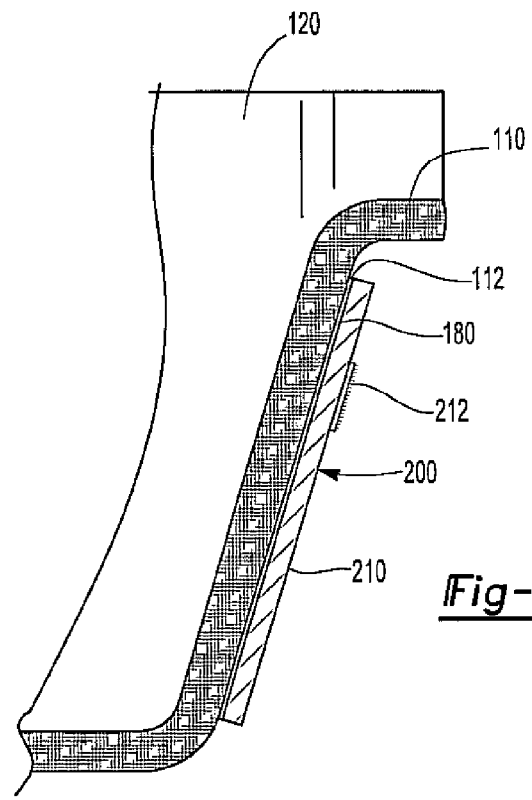
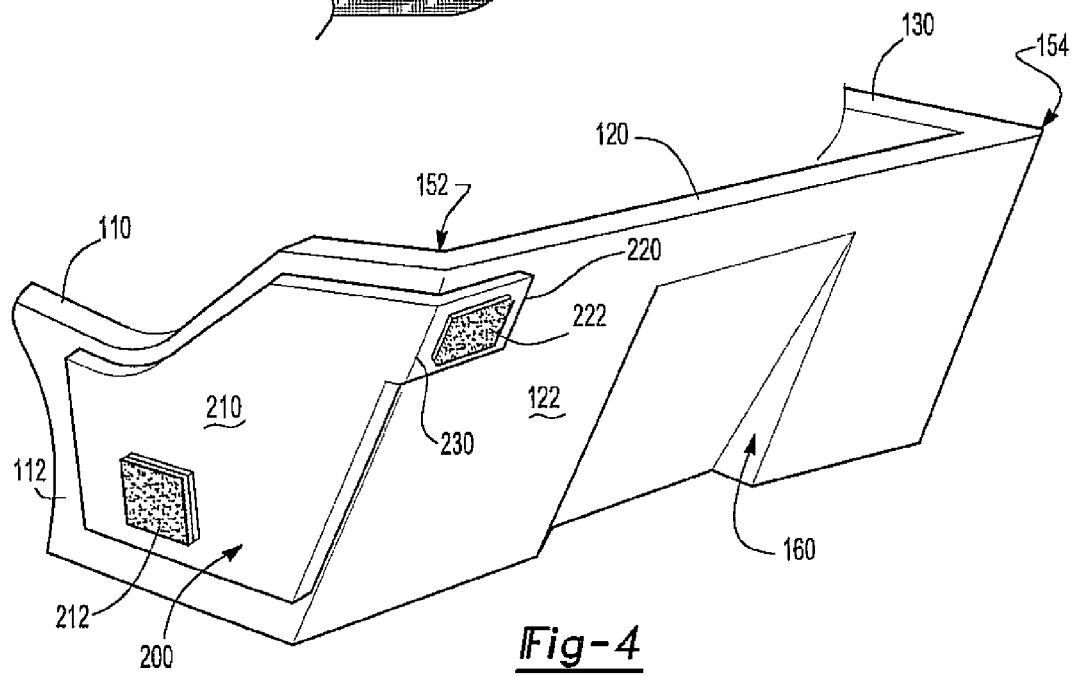

CARPET SYSTEM

BACKGROUND OF THE INVENTION

The use of carpet within motor vehicles is known. In most instances, a motor vehicle will have an interior floor with carpet covering at least a portion of the floor in order to provide an aesthetically pleasing interior compartment for a user of the motor vehicle, reduce road noise during operation of the vehicle, and the like.

In some instances, a motor vehicle can have a modular carpet system in which individual floor portions, such as a driver's side floorboard, a front passenger's side floorboard, a rear passenger's floorboard, etc., are covered with individual modular carpet systems. Such a modular carpet system can have a general shape similar to a rectangular shaped pan except for contours that complement and/or match contours that are present on the vehicle floorboard portion.

The use of such modular carpet systems affords for easy installation of the modular units within various areas of the motor vehicle. However, as heretofor modular carpet system experiences aging, wear, and ordinary use, it can start to lose at least a portion of its contoured shape. In addition, upon losing at least a portion of its contoured shape, a modular carpet unit can appear to be old, worn out, and/or not be aesthetically pleasing to the eye of a user of the vehicle. Therefore, a modular carpet unit or system that affords for extended life and use of the unit without loss of shape would be desirable.

SUMMARY OF THE INVENTION

The present invention discloses a carpet assembly having a piece of carpet with a backside, the backside having a plurality of contours. In addition, the carpet assembly has a generally rigid backside reinforcement panel attached to the backside of the piece of carpet, the backside reinforcement panel having a shape conforming to and covering at least a portion of at least one of the plurality of contours. The carpet assembly can be a modular carpet unit that includes a base panel, an end panel, and a side panel, with the end panel and the side panel extending from the base panel at an acute or obtuse angle. The end panel and side panel can have a corner portion therebetween by which the two panels are adjoined to each other.

The backside reinforcement panel can be attached to the backside of the side panel and wrap around at least a portion of the corner adjoining the end panel and the side panel. Likewise, the backside reinforcement panel can be attached to the end panel and wrap around at least a portion of the corner adjoining the end panel and the side panel. It is appreciated that the backside reinforcement panel can be attached to both the side panel, the end panel, and/or the corner portion adjoining the two panels.

The backside reinforcement panel can have a first generally planar portion that attaches to the side panel of the piece of carpet and a second generally planar panel that attaches to the end panel of the piece of carpet. The backside reinforcement panel can be attached to the backside of the piece of carpet using an adhesive, for example an epoxy adhesive, urethane adhesive, methacrylate adhesive, instant adhesive, contact adhesive, perma tack, hot melt adhesive and the like. In addition, the use of staples and/or other types of mechanical fasteners can be used to attach the backside reinforcement panel the backside of the piece of carpet.

The carpet assembly can be part of an interior for a motor vehicle, for example a modular carpet unit covering at least a portion of floorboard of the motor vehicle. The plurality of contours of the piece of carpet backside can generally conform to and be complementary with the floorboard contours of the vehicle. In addition, the backside of the piece of carpet and/or a backside of the reinforcement panel can be attached to the floorboard of the vehicle.

The present invention also discloses a process for maintaining a contoured shape of a piece of carpet, the process including providing a piece of carpet in the form of a carpet module which has a base panel, an end panel, and a side panel. The end panel and the side panel extend at an angle from the base panel and a corner portion is present between and adjoins the end panel and the side panel. A backside reinforcement panel is also provided and attached to a backside of the side panel and a backside of the corner between the base panel and the side panel. In this manner, the backside reinforcement panel supports and maintains the orientation of the side panel relative to the base panel and the end panel for extended periods of time.

BRIEF DESCRIPTION OF THE DRAWINGS

FIG. 1 is a perspective view of an interior of a portion of a motor vehicle having a piece of carpet according to an embodiment of the present invention;

FIG. 2 is a perspective view of a modular carpet unit according to an embodiment of the present invention;

FIG. 3 is a cross-sectional section of 3-3 shown in FIG. 2; and

FIG. 4 is a perspective of the modular carpet unit shown in FIG. 2 illustrating a backside of a generally rigid backside reinforcement panel according to an embodiment of the present invention.

DETAILED DESCRIPTION OF THE INVENTION

The present invention discloses a carpet assembly for a motor vehicle. As such, the invention has utility as a component of a motor vehicle interior.

The piece of carpet can be in the form of a modular carpet unit, the carpet unit having a backside with a plurality of contours. The shape of the modular unit, including the plurality of contours on the backside of the carpet, can be complementary to contours that are present within a generally confined space such as a floorboard of a motor vehicle. However, this is not required and the inventive carpet assembly can be used wherever a modular carpet unit is desired.

The modular carpet unit can include a generally rigid backside reinforcement panel that attaches to the backside of the modular carpet unit and has a shape that is complementary to at least one of the contours on the backside of the unit. In some instances, the generally rigid backside reinforcement panel wraps around a corner of the modular carpet unit and thereby ensures that two panels of the modular unit which join together to form the corner maintain their relative shape and orientation with respect to each other.

The generally rigid backside reinforcement panel can be attached to a backside of the carpet unit using adhesives such epoxy adhesives, urethane adhesives, methacrylate adhesives, instant adhesives, contact adhesives, perma tack, hot melt adhesives, and/or in the alternative, hook-and-loop fasteners, snaps, clips and the like. In addition, the modular carpet unit and/or the generally rigid backside reinforcement panel can be attached to a separate structure such as a floorboard of a motor vehicle, however such attachment to a separate structure is not required for the inventive modular carpet unit to maintain its shape and/or position. The backside of the modular carpet unit and/or the generally rigid backside reinforcement panel can be attached to the separate structure using hook-and-loop fasteners, adhesives, tape, staples, and the like.

Turning now to FIG. 1, an illustration of an interior portion of a motor vehicle MV is shown with a portion of a modular carpet unit 10 shown present in a driver's floorboard area. It is appreciated that the modular carpet unit 10 can also be present in a front passenger floorboard area, a rear passenger floorboard area, and the like.

Referring now to FIGS. 2-4, the modular carpet unit 10 can have a base panel 100, a first side panel 110, and a first end panel 120. Adjoining the first side panel 110 and the first end panel 120 can be a corner or corner portion 152. The modular carpet unit 10 can also have a second side panel 130 and a second end panel 140 as well as contours and/or corners such as contour 160 and corners 154, 156 and 158. It is appreciated that other features can be included as part of the unit 10, for example and for illustrative purposes only, a heel footpad (not shown) and/or a toe pad (not shown) as is known to those skilled in the art.

The modular carpet unit can have a backside. For example, the first side panel 110 can have a backside 112, the first end panel 120 can have a backside 122, the second side panel 130 can have a backside 132, and the second end panel 140 can have a backside 142. Attached to a portion of the backside of the modular carpet unit 10 can be a generally rigid backside reinforcement panel 200. As illustrated in FIGS. 2 and 3, the panel 200 can extend along a portion of the first side panel 110 and the first end panel 120. It is appreciated that the generally rigid backside reinforcement panel 200 can be attached to the backside 112 of the first side panel 110 and/or the back side 122 of the first end panel 120. It is also appreciated that a generally rigid backside reinforcement panel can extend along and be attached to other contours and/or corners of the modular carpet unit 10.

Again, and with reference to FIG. 3, the generally rigid backside reinforcement panel 200 is attached to a backside 112 of the side panel 110, wraps around and fits the contour of the corner 152, and extends along the backside 122 of the end panel 120. By extending along and being attached to the backside 112 of the side panel 110 and the backside 122 of the end panel 120, the generally rigid backside reinforcement panel 200 supports and/or holds the side panel 110 in a desired orientation relative to the end panel 120, floorboard, etc. Stated differently, the generally rigid backside reinforcement panel 200 prevents the corner 152, the side panel 110, and/or the end panel 120 from collapsing inwardly and having the modular carpet unit 10 appearing as if it is old, worn out, and the like.

Looking specifically at FIG. 4, a perspective view of a backside of the corner 152 and the side wall 110 and end wall 120 is illustrated. Although the generally rigid backside reinforcement panel 200 is illustrated with respect to the corner 152, it is appreciated that such a reinforcement panel can be located and attached to a backside of the corner 154, 156 and/or 158. In addition, such a backside reinforcement panel can be located and attached to a backside of the contour 160 and/or a backside of a corner 162 between the base panel 100 and the first side panel 120. As such, an inventive backside reinforcement panel can be used to support, stiffen, etc, any contour and/or corner of a piece of carpet that is molded to fit complimentary contours and/or corners of an adjacent structure. The backside reinforcement panel 200 can also have at least one attachment device, for example a hook and loop fastener 212 and/or 222, that affords for attachment of the panel 200 and thus the unit 10 to the adjacent structure. However, it should be appreciated that the use or inclusion of an attachment device on the backside of the panel 200 is not required.

A process for maintaining a contoured shape for a piece of carpet includes providing a piece of carpet having a base panel, an end panel, and a side panel. For example, and for illustrative purposes only, a modular carpet unit 10 as discussed above can be provided, the carpet unit 10 having the base panel 100, the side panel 110, and the end panel 120. In addition, the modular carpet unit 10 can also have additional side panels 130 and end panels 140.

After the modular unit 10 has been provided, the backside reinforcement panel 200 can also be provided, the panel 120 having a shape that is complementary to a corner and/or contour that is present on the backside of the carpet unit 10. The reinforcement panel 200 is then attached to the desired location of the backside of the modular carpet unit 10 such that the panel 200 wraps around a contoured portion of the unit 10. By being present and attached to a backside of the modular carpet unit 10, the reinforcement panel 200 ensures that the respective contour, about and/or which it is around which it is attached, maintains its shape for extended periods of time.

In accordance with the provisions of the patent statutes, the present invention has been described in what is considered to represent preferred embodiments. However, it should be noted that the invention can be practiced otherwise than as specifically illustrated and described without departing from its spirit or scope. For example, the piece of carpet, modular carpet unit and the like can include a plurality of layers known to those skilled in the art including but not limited to a thermoset urethane resin backing, a thermoplastic urethane resin mid-layer, a scrim sheet layer, fibrous tufts and the like. In addition, the generally rigid backside reinforcement panel can be made from any material known to those skilled in the art, illustratively including plastics, metals, alloys, ceramics, and the like. As such, the scope of the present invention is provided by the claims.

The invention claimed is:

1. A carpet assembly comprising:
   a piece of carpet having
   a backside with an end panel and a side panel extending at an angle from a base panel and a corner portion adjoining said end panel and side panel; and
   a generally rigid backside reinforcement panel attached to said backside of said piece of carpet and attached to said side panel and wrapping around at least a portion of said corner portion adjoining said end panel and said side panel of said piece of carpet.

2. The carpet assembly of claim 1, wherein said backside reinforcement panel is attached to said backside of said piece of carpet using an adhesive or a mechanical fastener.

3. The carpet assembly of claim 2, wherein said adhesive is hot glue.

4. The carpet assembly of claim 1, further comprising an interior portion of a vehicle having a shape that generally conforms to said plurality of contours of said piece of carpet backside.

5. The carpet assembly of claim 4, wherein said interior portion of said vehicle is a floorboard of said vehicle.

6. The carpet assembly of claim 5, wherein said backside reinforcement panel is attached to said floorboard of said vehicle.

7. The carpet assembly of claim 6, wherein said backside reinforcement panel is attached to said floorboard of said vehicle using a hook and loop fastener.

8. A carpet assembly for covering an interior portion of a vehicle, said carpet assembly comprising:
  a floorboard of a vehicle;
  a piece of carpet covering at least a portion of said floorboard, said piece of carpet having an end panel and a side panel, said end panel and said side panel extending at an angle from a base panel with a corner portion adjoining said end panel and side panel;
  a backside reinforcement panel located between said piece of carpet and said floorboard, said reinforcement panel attached to a backside of said piece of carpet and extending around at least part of said corner portion adjoining said end panel and said side panel of said piece of carpet.

9. The carpet assembly of claim 8, wherein said backside reinforcement panel is attached to said backside of said piece of carpet using an adhesive or a mechanical fastener.

10. The carpet assembly of claim 9, wherein said adhesive is a hot melt adhesive.

11. A process for maintaining a contoured shape of a piece carpet comprising:
  providing a piece of carpet having a base panel, an end panel and a side panel, the end panel and the side panel extending at an angle from the base panel with a corner portion adjoining the end panel and the side panel;
  providing a backside reinforcement panel;
  attaching the backside reinforcement panel to a backside of the side panel and a backside of the corner portion adjoining the end panel and the side panel of the piece of carpet such that the backside reinforcement panel supports and maintains the orientation of the side panel relative to the base panel for extended periods of time.

12. The process of claim 11, further including attaching a backside of the generally rigid backside reinforcement panel to a separate structure.

* * * * *